US010605988B2

(12) United States Patent
Testa et al.

(10) Patent No.: US 10,605,988 B2
(45) Date of Patent: Mar. 31, 2020

(54) OPTICAL BEAM SPOT SIZE CONVERTER

(71) Applicant: Telefonaktiebolaget LM Ericsson (publ), Stockholm (SE)

(72) Inventors: Francesco Testa, Pisa (IT); Tommaso Cassese, Pisa (IT); Marco Romagnoli, Pisa (IT); Luigi Tallone, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/320,375

(22) PCT Filed: Sep. 1, 2016

(86) PCT No.: PCT/EP2016/070660
§ 371 (c)(1),
(2) Date: Jan. 24, 2019

(87) PCT Pub. No.: WO2018/024347
PCT Pub. Date: Feb. 8, 2018

(65) Prior Publication Data
US 2019/0265410 A1    Aug. 29, 2019

(30) Foreign Application Priority Data
Aug. 2, 2016 (WO) ................. PCT/EP2016/068454

(51) Int. Cl.
*G02B 6/122* (2006.01)
*G02B 6/12* (2006.01)
(Continued)

(52) U.S. Cl.
CPC ............. *G02B 6/1228* (2013.01); *G02B 6/00* (2013.01); *G02B 6/12002* (2013.01); *G02B 6/14* (2013.01);
(Continued)

(58) Field of Classification Search
CPC .................................................... G02B 6/1228
See application file for complete search history.

(56) References Cited

U.S. PATENT DOCUMENTS

2002/0172464 A1* 11/2002 Delwala ................. B82Y 20/00
385/40
2010/0040327 A1    2/2010 Deki et al.
(Continued)

FOREIGN PATENT DOCUMENTS

CN    101641622 A    2/2010
CN    103998961 A    8/2014

OTHER PUBLICATIONS

Hatori, Nobuaki, et al., "A Hybrid Integrated Light Source on a Silicon Platform Using a Trident Spot-Size Converter", Journal of Lightwave Technology, vol. 32, No. 7, Apr. 1, 2014, pp. 1329-1335.
(Continued)

*Primary Examiner* — Omar R Rojas
(74) *Attorney, Agent, or Firm* — Murphy, Bilak & Homiller, PLLC

(57) ABSTRACT

An optical beam spot size convertor is provided having a body. The body comprises a first optical waveguide having a first refractive index and a plurality of second optical waveguides each having a second refractive index higher than the first refractive index. The first optical waveguide is arranged to receive an input optical beam. The first optical waveguide is further arranged such that light from the input optical beam is coupled from the first optical waveguide into the plurality of second optical waveguides. The body further comprises an output optical waveguide and a reflective part coupled to the plurality of second optical waveguides and to the output optical waveguide. The reflective part is arranged to focus optical beams received from the plurality of second
(Continued)

optical waveguides into a single optical beam which is directed to the output optical waveguide.

15 Claims, 11 Drawing Sheets

(51) Int. Cl.
    *G02B 6/14*     (2006.01)
    *G02B 6/124*    (2006.01)
    *G02B 6/00*     (2006.01)

(52) U.S. Cl.
    CPC ........ *G02B 6/124* (2013.01); *G02B 2006/121* (2013.01); *G02B 2006/12038* (2013.01); *G02B 2006/12061* (2013.01); *G02B 2006/12104* (2013.01)

(56) References Cited

U.S. PATENT DOCUMENTS

| | | |
|---|---|---|
| 2014/0205234 A1 | 7/2014 | Rong et al. |
| 2014/0294341 A1 | 10/2014 | Hatori et al. |
| 2015/0247974 A1 | 9/2015 | Painchaud et al. |
| 2016/0018610 A1 | 1/2016 | Krishnamurthi et al. |

OTHER PUBLICATIONS

Shimizu, Takanori, et al., "High Density Hybrid Integrated Light Source with a Laser Diode Array on a Silicon Optical Waveguide Platform for Inter-Chip Optical Interconnection", Proc. 8th IEEE Int'l Conf. on Group IV Photonics, Sep. 14-16, 2011, pp. 181-183.

Yamada, Hirohito, "Analysis of Optical Coupling for SOI Waveguides", PIERS Online, vol. 6, No. 2, 2010, pp. 165-168.

Zhou, Zhiping, et al., "On-chip light sources for silicon photonics", Light: Science & Applications (2015), Nov. 20, 2015, pp. 1-13.

\* cited by examiner

PRIOR ART

PRIOR ART

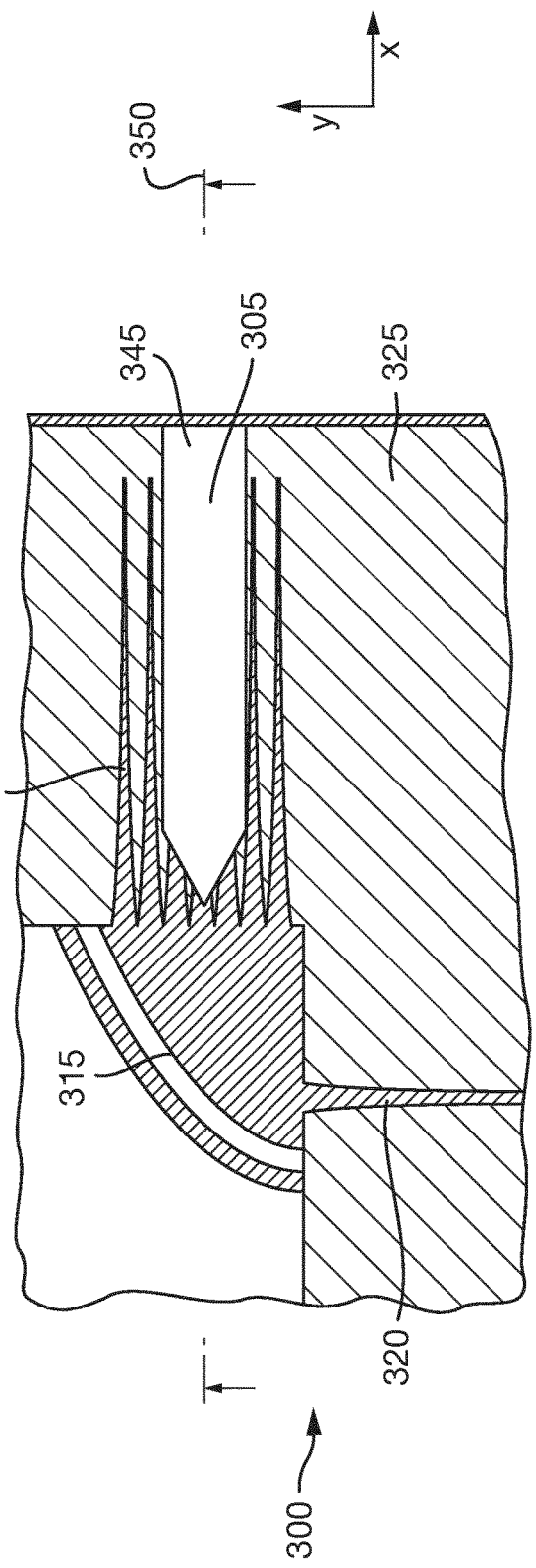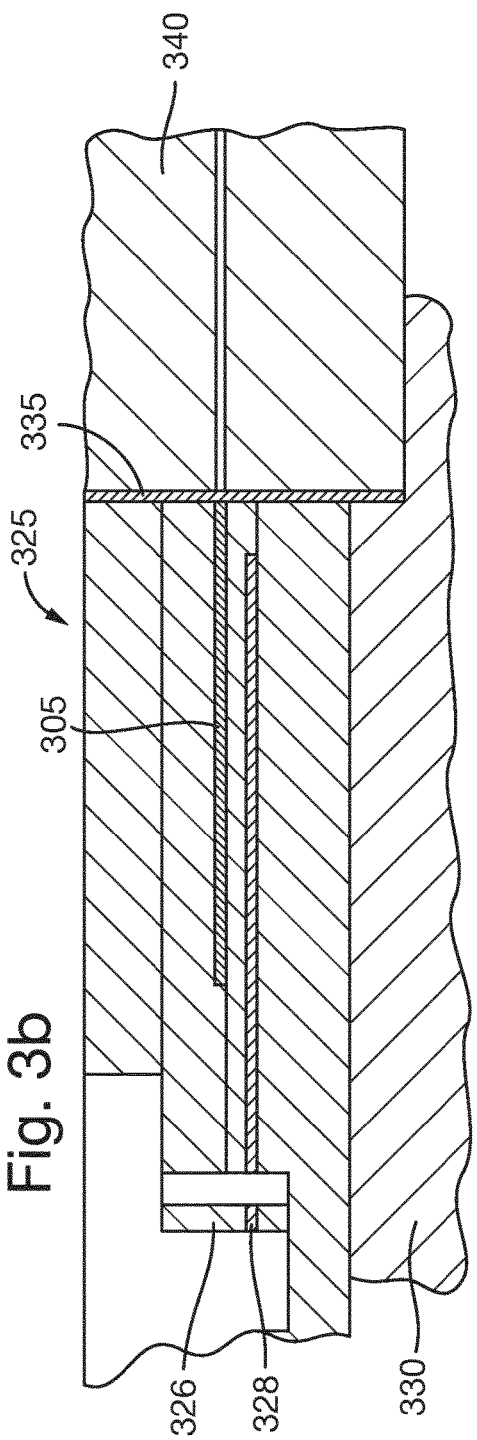

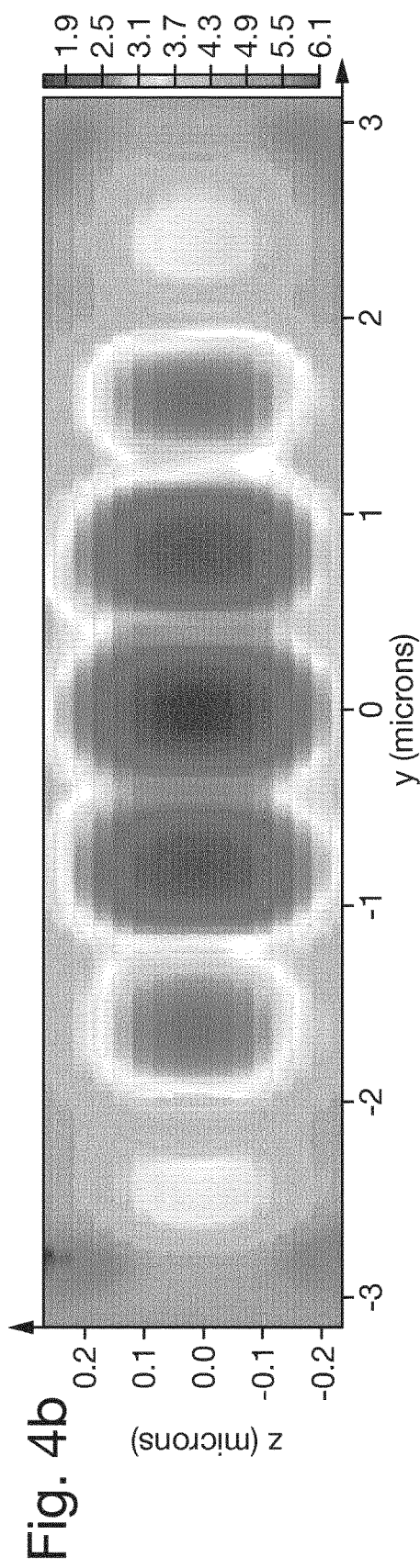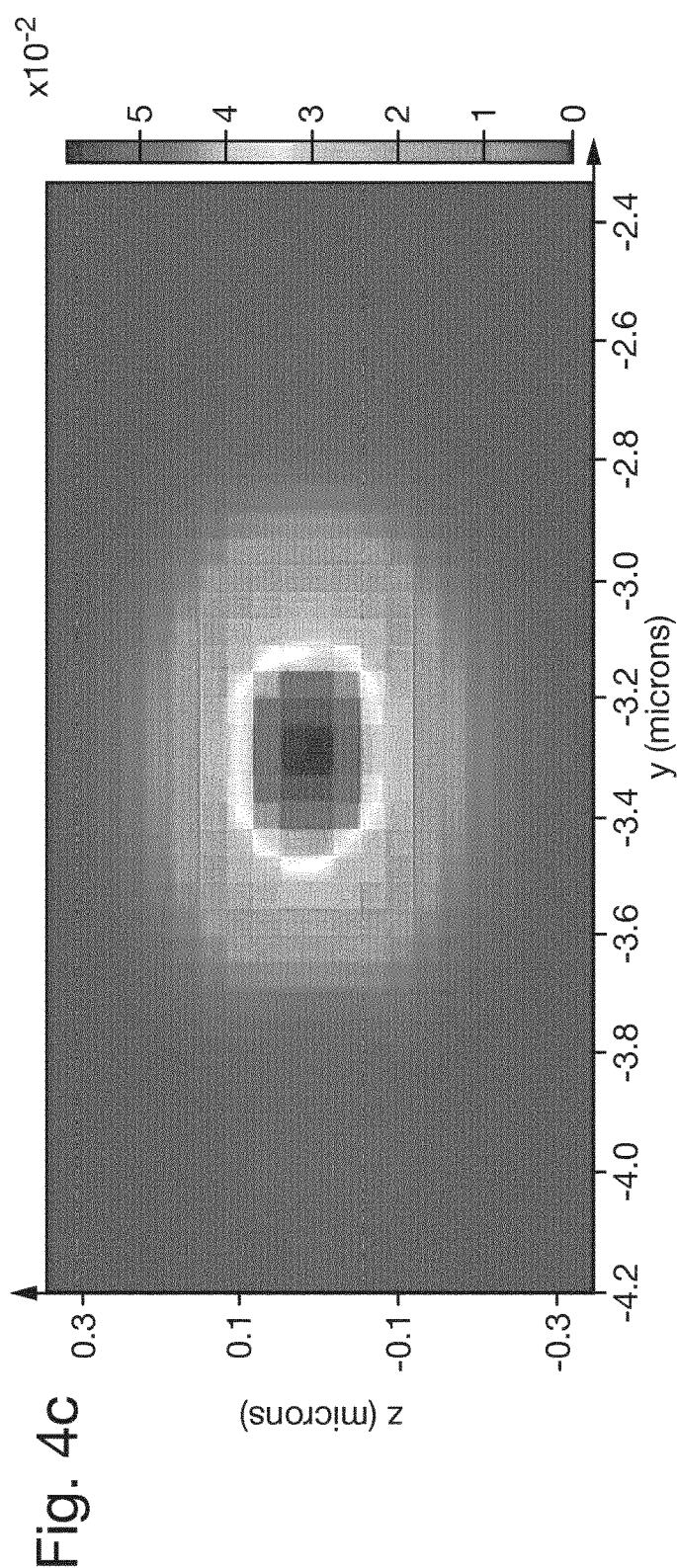

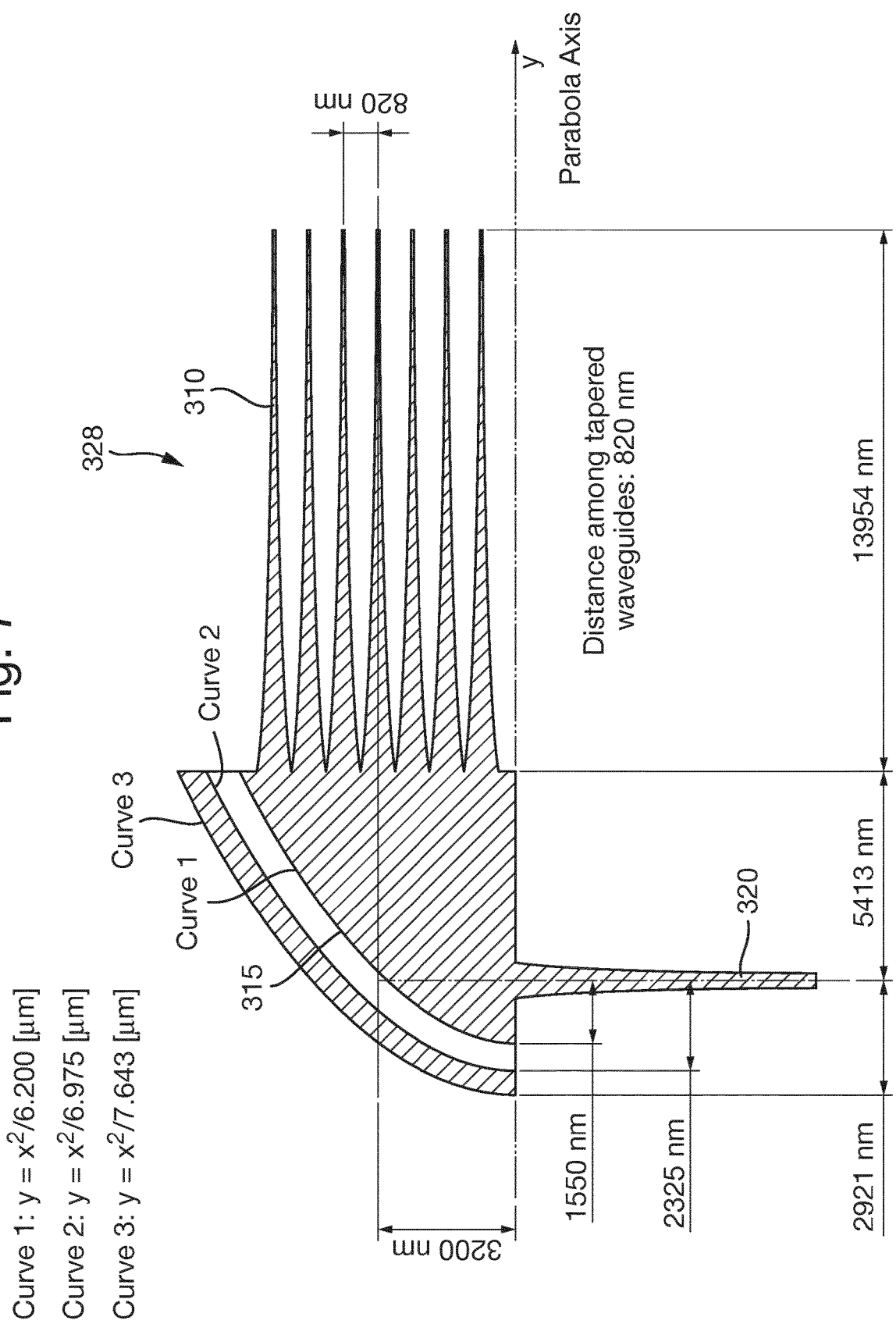

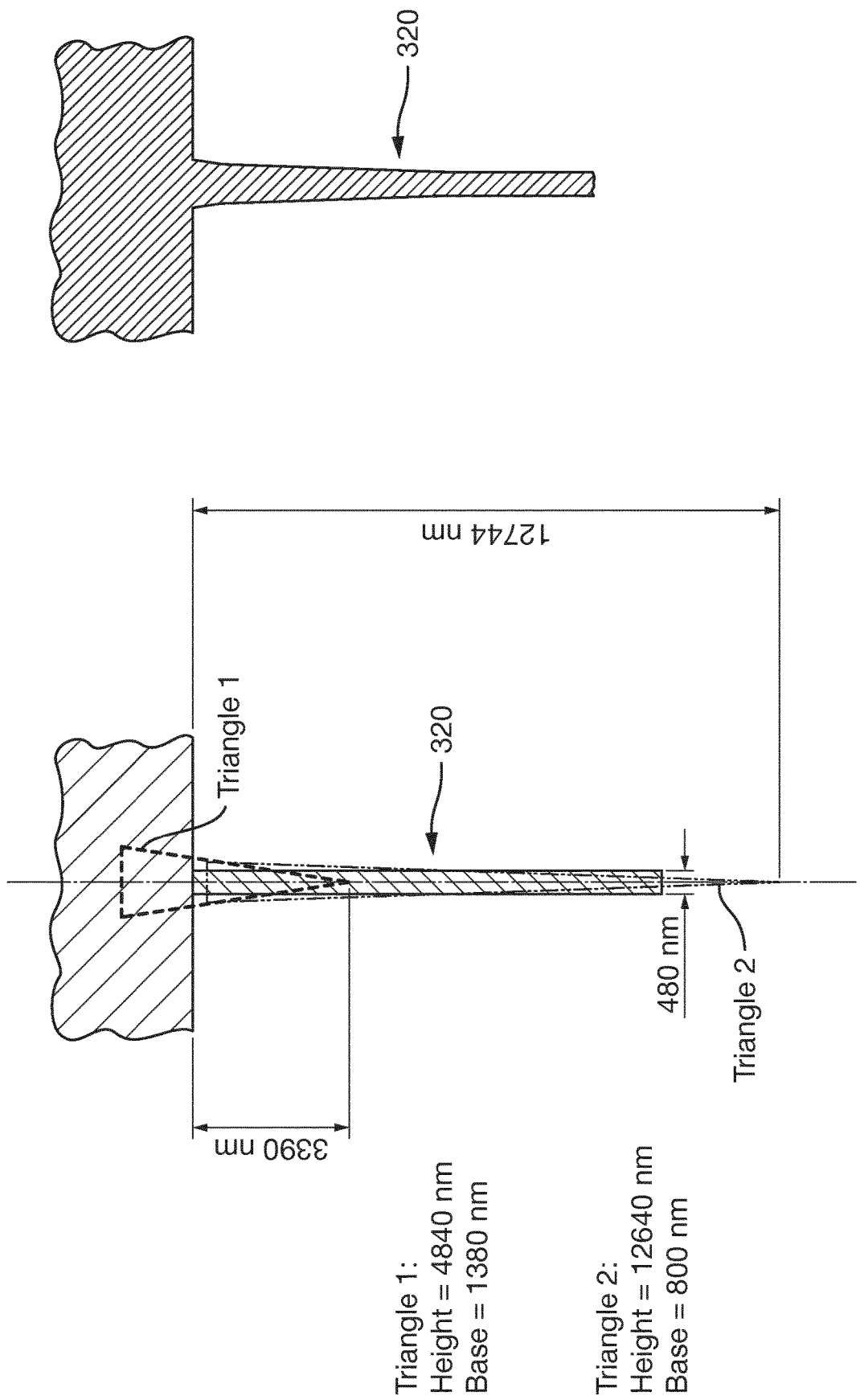

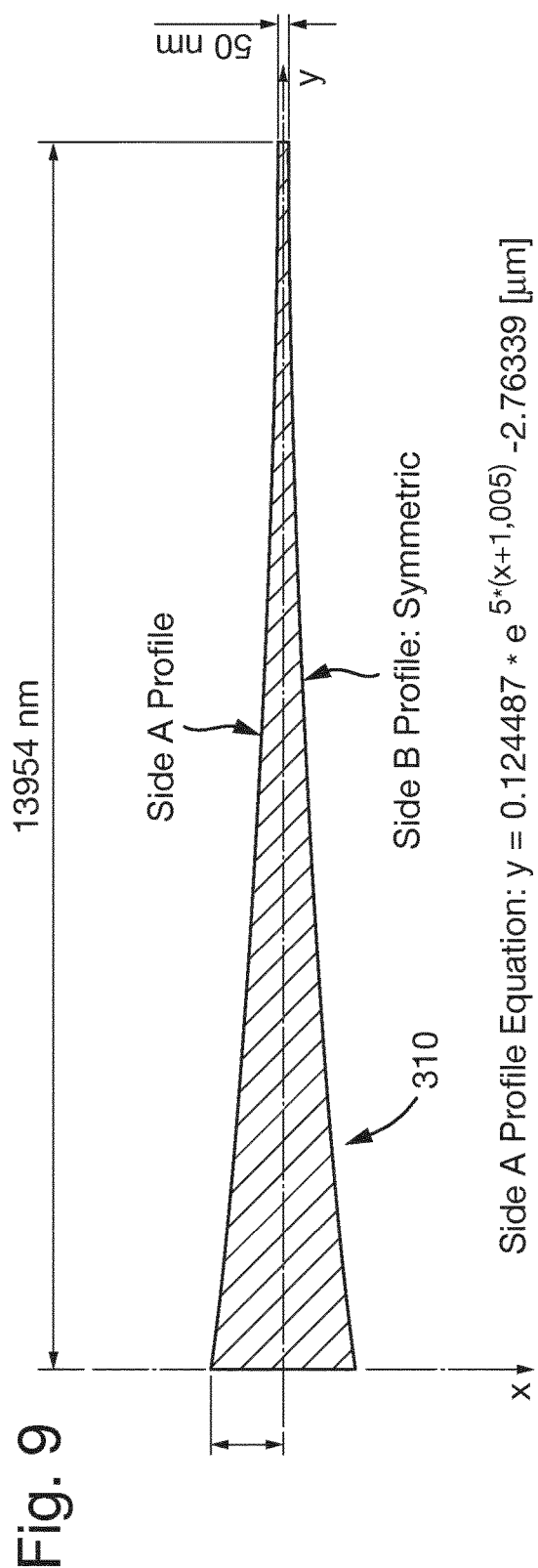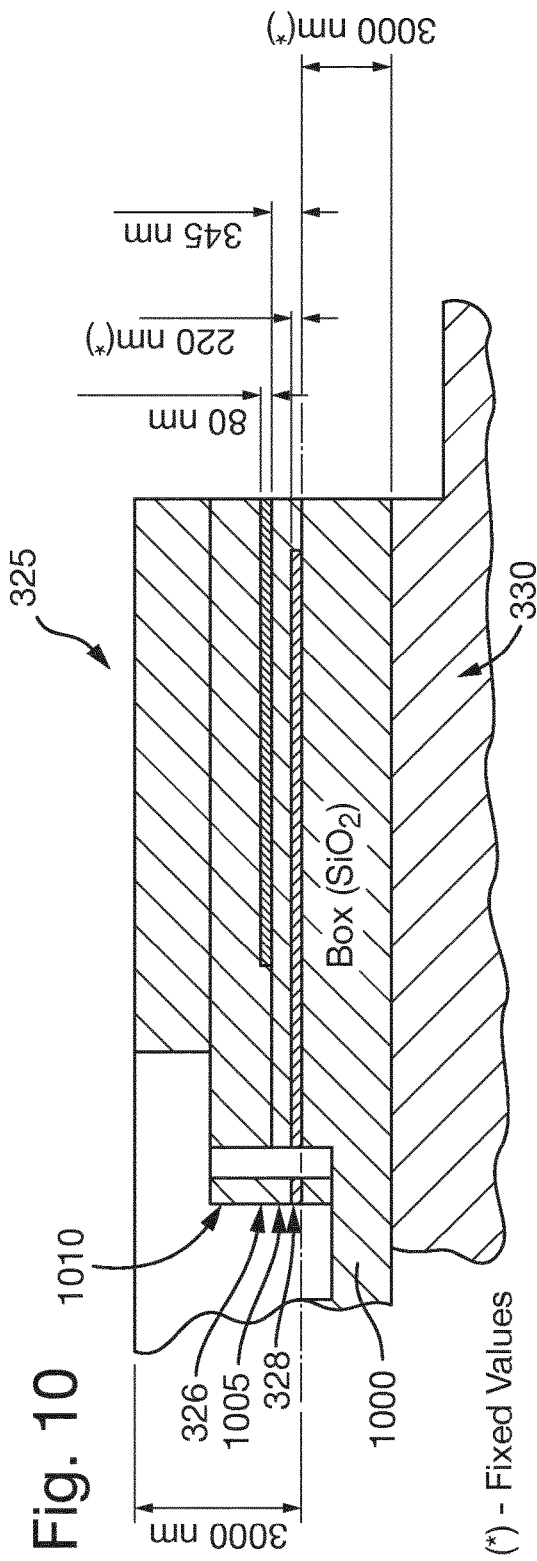

OPTICAL BEAM SPOT SIZE CONVERTER

TECHNICAL FIELD

The present invention relates to an optical beam spot size convertor, and a photonics systems chip comprising an optical beam spot size convertor.

BACKGROUND

Recent advances in Silicon Photonics technology, enabled by the technology's compatibility with complementary-metal-oxide-semiconductor (CMOS) production techniques, have made Photonic Systems on a Chip (PSoC) a reality. PSoCs may comprise a large number of application specific photonic circuits on a chip of only a few squared millimetres. This means PSoCs may be used to produce high scale optical switching devices, high speed multi-wavelength transceivers or other types of optical processing devices.

However, PSoCs have optical losses, which increase in dependence on the number of photonic circuits integrated in a chip. In many applications such as data centers or radio access networks optical interconnect interfaces coupled to PSoCs do not have a large enough power budget to tolerate such optical losses. Although an Erdium Doped Fibre Amplifier (EDFA) could be used to increase the power of an optical signal output by a PSoC, this solution is not viable due to cost.

Therefore, a substantially loss-less PSoC is desirable. However, since silicon material is incapable of generating light, a light amplification element in the form of a semiconductor optical amplifier (SOA), made from III-V materials, would need to be integrated into the silicon photonics chip. Similarly, if it is desired to produce a PSoC with complex multi-channel optical transceivers including several lasers, it is necessary to integrate lasers in the form of dies with III-V active layers into the silicon chip.

Various techniques have been researched for integrating SOAs/lasers into PSoCs, for example as detailed in Zhiping Zhou, Bing Yin and Jourgen Michel "On-chip light sources for silicon photonics" Light: Science and Applications (2015) 4, e358; doi: 10.1038/lsa.2015.131, 2015. A feasible technique is based on flip-chip bonding of 111-V dies (with SOA and/or laser functions) on the silicon substrate. In this technique an interface of the 111-V die is butt coupled in front of a silicon waveguide. However, the optical beam spot size of silicon waveguides (normally of a few hundred nanometer) and the optical beam spot size of the 111-V dies are very different. Thus, in order to achieve a low coupling loss, optical beam Spot Size Convertor (SSC) circuits need to be used.

There are a number of existing SSC circuits. A first type of SSC is described in Shimizu T, Hatori N, Okano M, Ishizaka M, Urino Y et al "High density hybrid integrated light source with a laser diode array on a silicon optical waveguide platform for interchip optical interconnection" $8^{th}$ IEEE International Conference on Group IV Photonics, IEEE 2011 page 181-183; and in Hirohito Yamada "Analysis of Optical Coupling for SOI waveguides" PIERS Online Vol. 6, No. 2, 2010. This first type of SSC 100 is illustrated in FIG. 1.

The SSC 100 comprises a silicon (Si) optical waveguide 105 surrounded with a silicon enriched oxide ($SiO_x$) optical waveguide core layer 110. The silicon optical waveguide 105 and silicon enriched oxide optical waveguide 110 are surrounded by a silica cladding layer 115 and are on top of a buried oxide (BOX) layer 116, which is arranged on a silicon (Si) substrate 120. The silicon optical waveguide 105 has an inverse taper, whereby the width of the silicon optical waveguide 105 gradually increases, along a portion of its length extending from a first end 125 of the silicon optical waveguide 105. Light input, for example from a III-V die, is confined inside the silica structure and during its propagation the light changes its mode shape so as to fit into the silicon optical waveguide 105. In this way, the light output from the SSC 100 has a different optical beam spot size from the light input into the SSC 100.

However, this SSC 100 has the disadvantage that its length is some hundreds of micrometres (μm), which means that the SSC 100 is too large for use in high integration scale PSoCs. Furthermore, the coupling loss of this SSC 100 with perfect input/output alignment exceeds 2 dB while with a misalignment of +−1 μm (which corresponds to the alignment accuracy of a commercial flip-chip machine) a total coupling loss of 3 dB has been measured.

A second type of SSC is described by Nobuaki Hatori et al in "A hybrid integrated light source on a silicon platform using a trident spot size convertor" IEEE JLT, Vol. 32, N.7 (2014) and illustrated in FIG. 2. This SSC 200 comprises three tapered silicon waveguides 205 arranged in the shape of a trident fork. These silicon waveguides 205 are surrounded by a silica cladding layer 210 on top of a buried oxide (BOX) layer 211, which is arranged on a silicon substrate 215. As in the first type of SSC 100, light input into the SSC 200, for example from a III-V chip, is confined inside the silica structure and during propagation the light changes its mode shape so as to fit into the silicon waveguides 205. In this way, the light output from the SSC 200 has a different optical beam spot size from the light input into the SSC 200.

However, this second type of SSC 200 has similar disadvantages to the first type of SSC 100 described above. The length of the SSC 200 in FIG. 2 is still about 150 μm. Furthermore, the SSC 200 has similar coupling loss characteristics to that of the SSC 100.

The Applicant has appreciated that it would be desirable to provide an optical beam spot size convertor having a smaller size than the above-described SSCs without increasing and preferably decreasing coupling loss and/or misalignment tolerance. The Applicant has further appreciated that it would be desirable to provide an optical beam spot size convertor which is simple to mass-produce, at low cost. Advantageously, such an optical beam spot size convertor may be used to increase the density of photonic integrated circuits in a photonic systems chip.

SUMMARY

According to the present invention there is provided an optical beam spot size convertor (SSC) having a body. The SSC body comprises a first optical waveguide having a first refractive index, and a plurality of second optical waveguides each having a second refractive index higher than the first refractive index. The first optical waveguide is arranged to receive an input optical beam. Further, the first optical waveguide is arranged such that light from the input optical beam is coupled from the first optical waveguide into the plurality of second optical waveguides. The body further comprises an output optical waveguide, and a reflective part coupled to the plurality of second optical waveguides and to the output optical waveguide. The reflective part is arranged to focus optical beams received from the plurality of second optical waveguides into a single optical beam which is directed to the output optical waveguide.

This arrangement has the advantage that an optical beam spot size convertor embodying the present invention may be smaller than the SSCs 100, 200 described above, and in particular may have a shorter length than the SSCs 100, 200 described above. Coupling light from the first optical waveguide into a plurality of second optical waveguides, rather than only one second optical waveguide, enables faster coupling, and thus the length of the optical waveguides may be shorter. Furthermore, this arrangement may provide similar or lower coupling loss/misalignment tolerance than the above described SSCs 100, 200. In addition, advantageously, an optical beam spot size convertor embodying the present invention may be easily mass-produced at relatively low cost.

In an embodiment the first refractive index (and thus also the second refractive index) is higher than a refractive index of the body. The body may be a silica body.

The first optical waveguide may be made from a silicon compound, preferably from silicon nitride. The plurality of second optical waveguides may be made from silicon. This formation may have the advantage of increasing the speed of coupling of light from the first optical waveguide into the plurality of second optical waveguides, and thus enable the waveguides to be even shorter. Furthermore, advantageously, silicon nitride as well as silicon is compatible with a CMOS production technique. Thus this formation may facilitate manufacture. However, it should be appreciated that other suitable materials may be used for the first and second optical waveguides.

Further, the output optical waveguide may be made from silicon.

In an embodiment, at least one of the plurality of second optical waveguides and the output optical waveguide has a taper along at least a portion of its length. Thus, the mode shape, and therefore spot size, of an optical beam may change as it propagates along the respective waveguide.

In a preferred embodiment, each of the second optical waveguides has an inverse taper along at least a portion of its length extending towards the reflective part. This means that the width of each second optical waveguide increases closer to the reflective part. The inverse taper may be substantially exponential.

In addition or alternatively, in a preferred embodiment, the output optical waveguide may have a taper along at least a portion of its length extending from the reflective part. This means that the width of the output optical waveguide may decrease further from the reflective part.

In an embodiment, the first optical waveguide is part of a first layer of the SSC body and the plurality of second optical waveguides are part of a second layer of the SSC body. The first layer is provided above the second layer such that at least a portion of the first optical waveguide is arranged above at least a portion of the plurality of second optical waveguides.

In a preferred embodiment, the reflective part and the output optical waveguide are also part of the second layer. This may facilitate manufacture as the reflective part, output optical waveguide and plurality of second optical waveguides may be formed in an integrated layer, for example a silicon layer.

The reflective part may comprise a parabolic or other shaped mirror. Thus, the reflective part may simply be formed by etching of such a silicon layer. However, it should be appreciated that other implementations of the reflective part are feasible.

In an embodiment, the first optical waveguide has a first longitudinal axis and the plurality of second optical waveguides each have a second longitudinal axis. The first longitudinal axis and the second longitudinal axis are in substantially the same direction.

In a preferred embodiment, the output optical waveguide has a third longitudinal axis, and the output optical waveguide is arranged such that its third longitudinal axis is at an angle with respect to the second longitudinal axis. This angle may be approximately 90 degrees, and preferably greater than 45 degrees. Thus, advantageously, the length of the optical beam spot size convertor may be limited, and the optical beam spot size convertor may be more compact.

According to the present invention, there is also provided a photonic system chip comprising an optical beam spot size convertor as described above.

BRIEF DESCRIPTION OF THE DRAWINGS

The prior art has been described with respect to.

Figure 1:
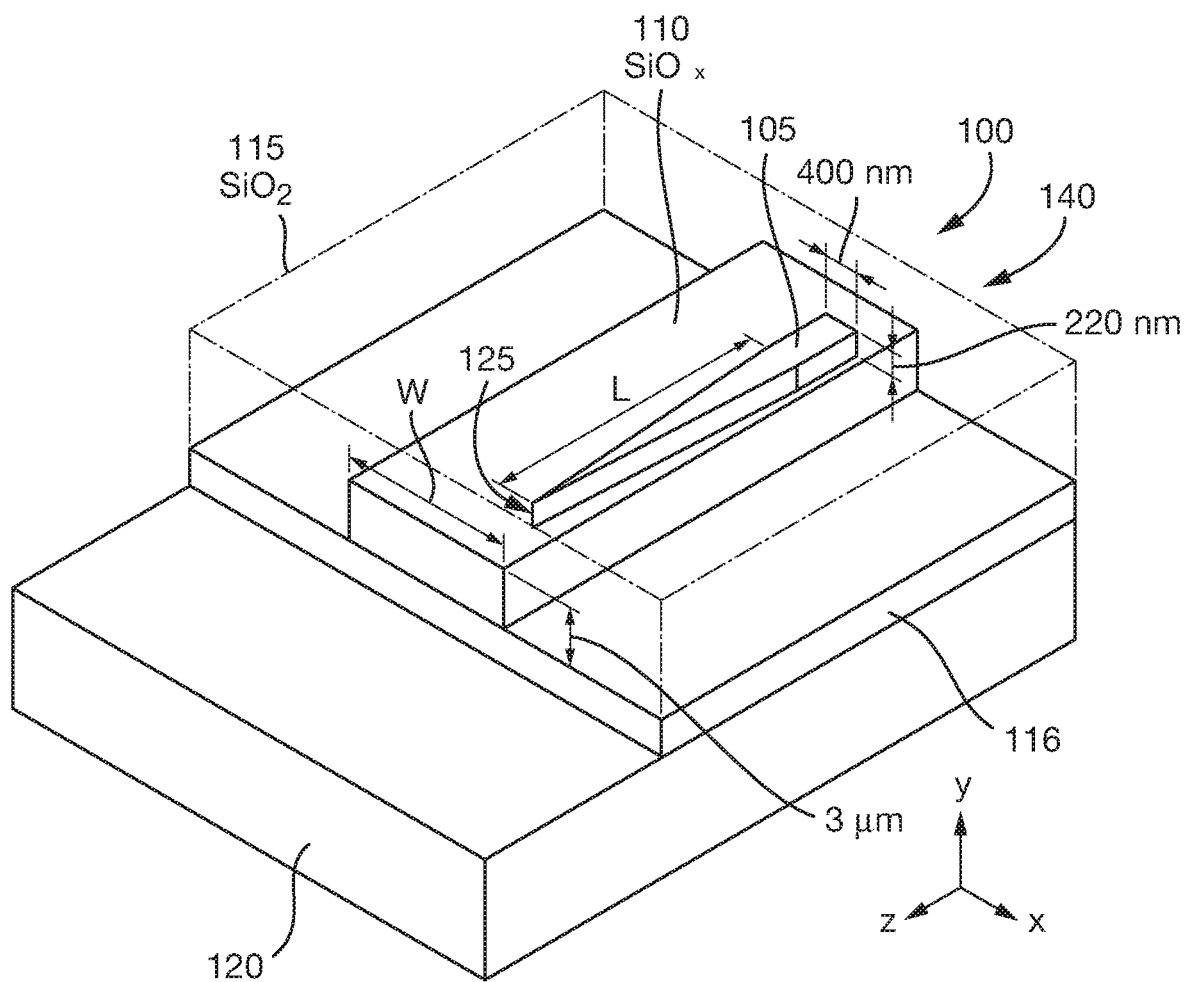
FIG. 1 which shows a first type of known Spot Size Convertor (SSC) circuit.
Figure 2:
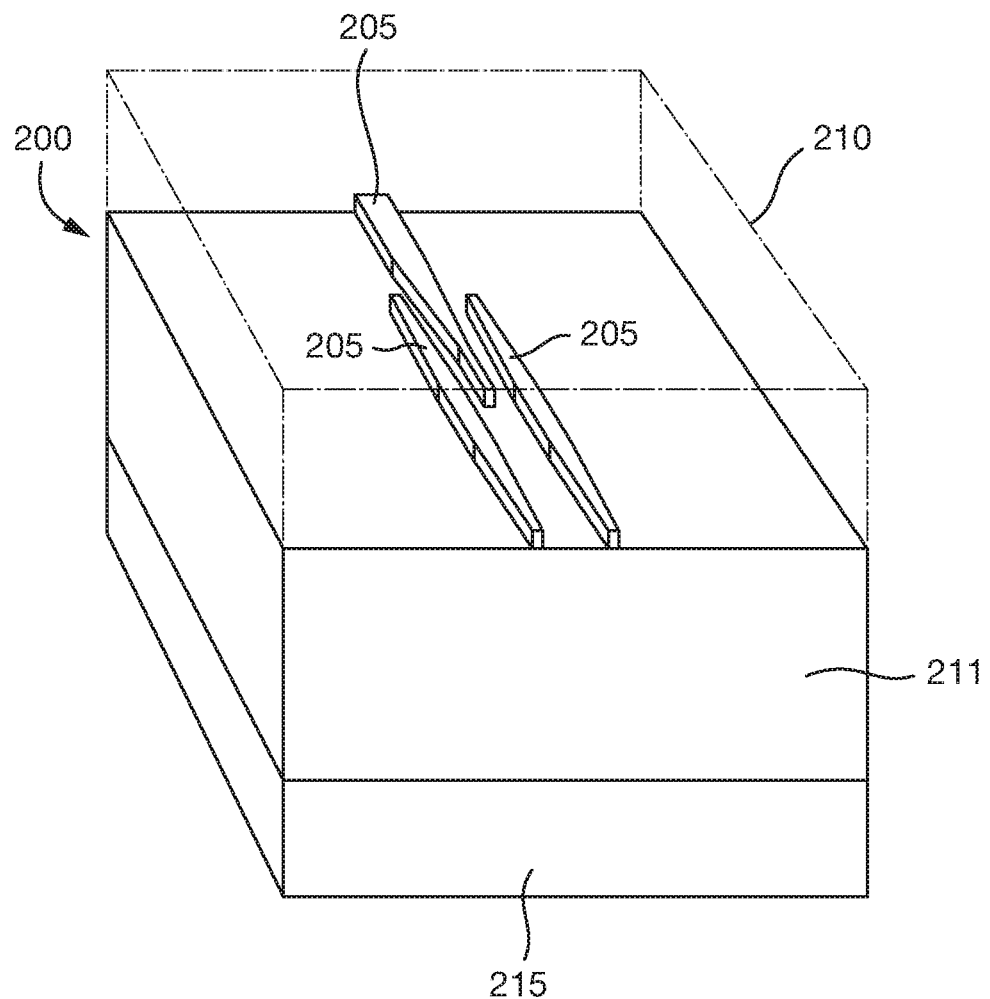
FIG. 2 which shows a second type of known Spot Size Convertor (SSC) circuit.
Figure 4A:
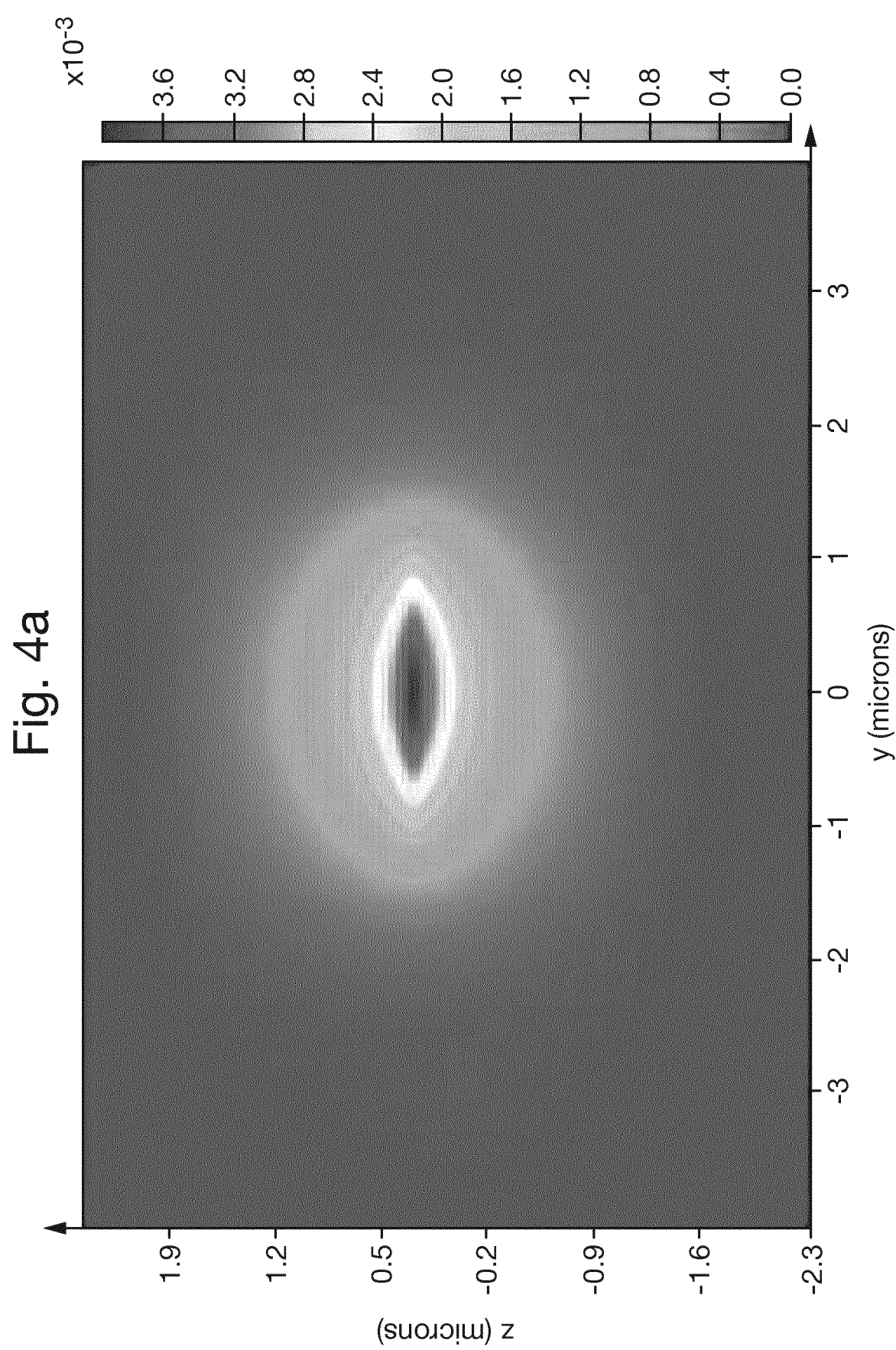
Figure 5:
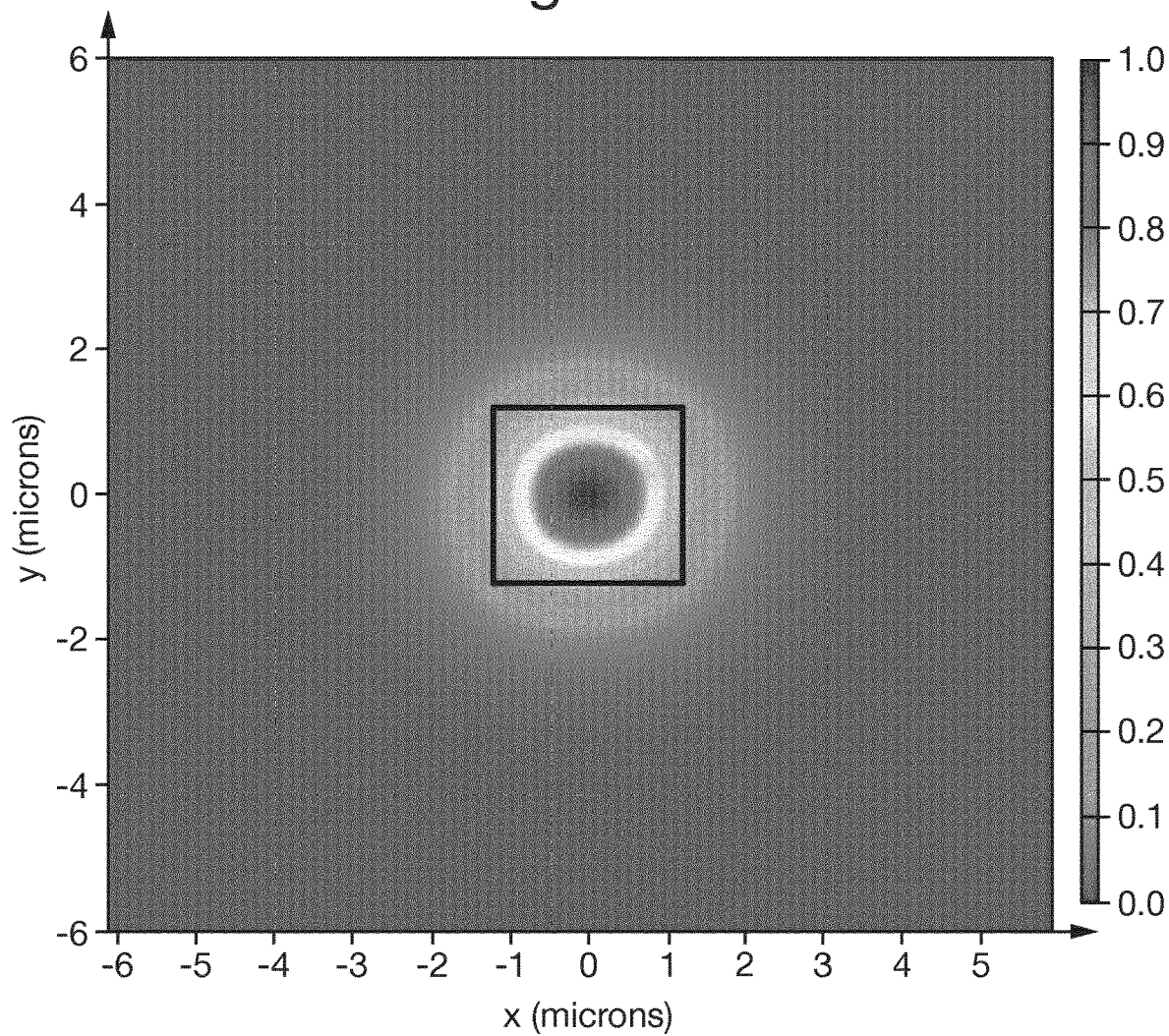
Figure 6:
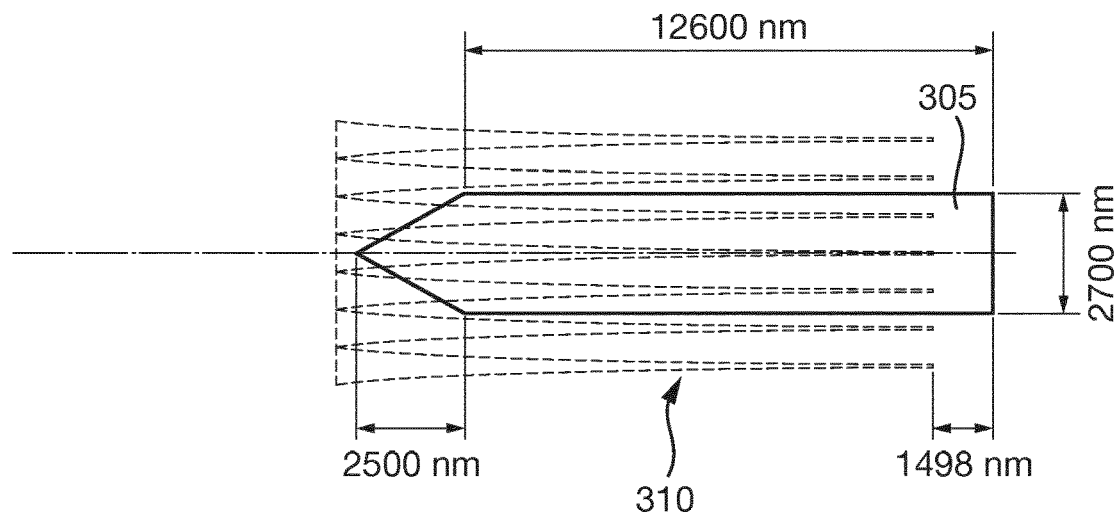

Embodiments of the present invention will now be described, by way of example only, with reference to the following Figures:

FIG. 3 illustrates an optical beam spot size convertor of a preferred embodiment: FIG. 3*a* shows a top view of the optical beam spot size convertor; and FIG. 3*b* shows a side view of the optical beam spot size convertor;

FIGS. 4*a* to 4*c* illustrate a change in mode shape and therefore spot size of input light during its propagation through the optical beam spot size convertor illustrated in FIG. 3;

FIG. 5 illustrates, by way of example only, the mode size of light which may be input into the optical beam spot size convertor from a particular laser chip;

FIG. 6 shows example design parameters of the silicon nitride waveguide shown in FIG. 3;

FIG. 7 shows example design parameters of the silicon layer shown in FIG. 3;

FIG. 8 shows example design parameters of the output optical waveguide shown in FIG. 3.

FIG. 9 shows example design parameters of a tapered silicon waveguide shown in FIG. 3;

FIG. 10 shows example design parameters of the vertical structure of the optical beam spot size convertor shown in FIG. 3.

Figure 11:
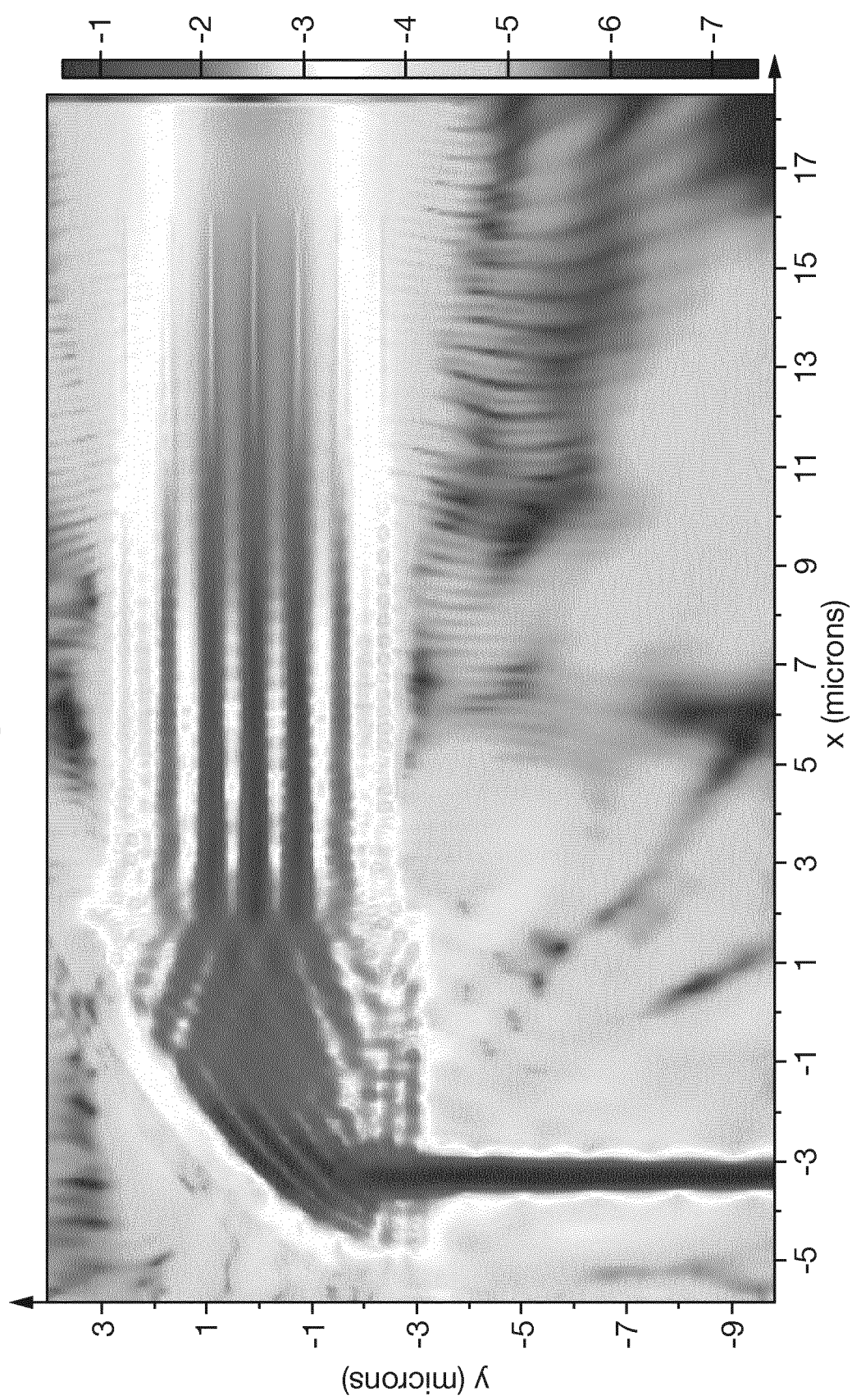
Figure 12:
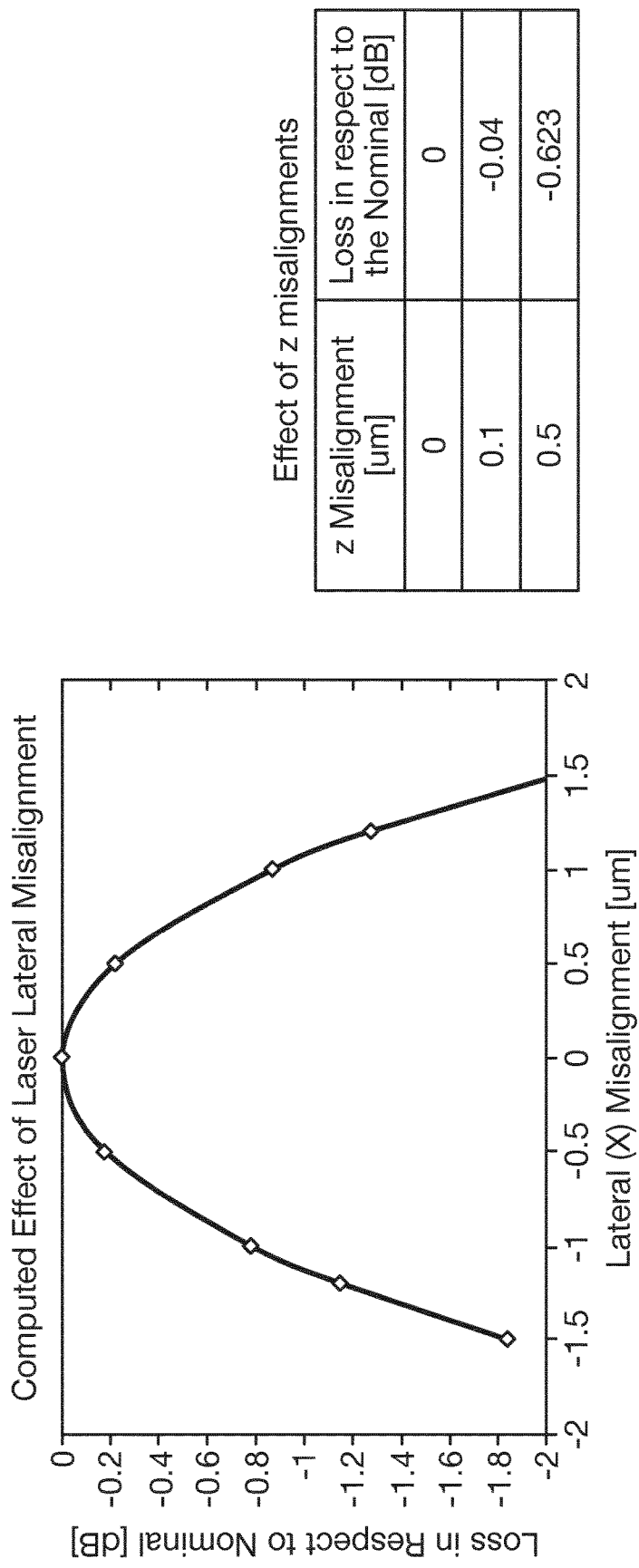
Figure 13:
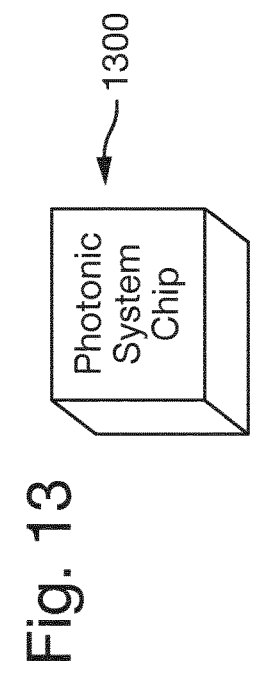

FIG. 11 shows the results of a numerical Finite Difference Time Domain (FDTD) simulation of the power distribution (logarithmic scale) at the silicon layer of the optical beam spot size convertor of FIG. 3 having the example design parameters shown in FIGS. 6 to 10;

FIG. 12 illustrates the effect of misalignments on coupling efficiency on the optical beam spot size convertor of FIG. 3 having the example design parameters shown in FIGS. 6 to 10; and FIG. 13 shows a photonic system chip.

DETAILED DESCRIPTION OF EMBODIMENTS

FIG. 3 illustrates an optical beam spot size convertor 300 (which may be referred to simply as a Spot Size convertor, SSC) according to a preferred embodiment of the present invention. In particular, FIG. 3*a* shows the optical beam spot size convertor 300 from a top view, and FIG. 3*b* shows the optical beam spot size convertor 300 from a side, i.e. a cross-sectional, view. As will be understood by those skilled in the art, an optical beam spot size convertor 300 is capable of converting or changing a spot size of an input optical beam, whereby the corresponding optical beam output from the optical beam spot size convertor 300 has a different spot size from the input optical beam.

The optical beam spot size convertor 300 comprises a first optical waveguide 305, a plurality of second optical waveguides 310, a reflective part 315, and an output optical waveguide 320. These elements 305, 310, 315 and 320 are comprised within a body 325, which in this example comprises silica ($SiO_2$) as will be described in more detail below. With reference to FIG. 3b, it can be seen that in this example the body 325 is made up of a plurality of layers i.e. the body 325 is a multi-layer body. In this example, the SSC 300 is arranged on a silicon substrate 330.

The first optical waveguide 305 is arranged to receive an input optical beam, in this example at its end portion 345 which has an interface at a surface 335 of the body 325. In this example, the first optical waveguide 305 has a width greater than that of each of the second optical waveguides 310 (although smaller than the total width of the plurality of second optical waveguides 310). The first optical waveguide 305 may be referred to as a strip.

The first optical waveguide 305 is further arranged such that light from the input optical beam is coupled from the first optical waveguide 305 into the plurality of second optical waveguides 310.

This coupling is enabled since the plurality of second optical waveguides 310 have a refractive index (which may be referred to as a second refractive index) which is higher than the refractive index of the first optical waveguide 305 (which may be referred to as a first refractive index). In this example, the first optical waveguide 305 is made from a silicon compound, specifically silicon nitride ($Si_3N_4$), and the plurality of second optical waveguides 310 are made from silicon (Si) which has a higher refractive index than silicon nitride. However, it should be appreciated that other materials may be used for the first optical waveguide 305 and/or the second optical waveguides 310. In this example, the first refractive index of the first optical waveguide 305, whilst lower than the second refractive index of the second optical waveguides 310, is higher than the refractive index of the body 325.

More specifically, in this example, as shown in FIG. 3b, the first optical waveguide 305 is arranged at (i.e. is part of) a first layer 326 of the body 325/SSC 300, and the plurality of second optical waveguides 310 are part of a second layer 328 of the body 325/SSC 300, which is provided below the first layer 326. In particular, in this example, the first layer 326 is provided above the second layer 328 such that at least a portion of the first optical waveguide 305 is arranged above at least a portion of the plurality of second optical waveguides 310. Note that there is no direct contact between the first optical waveguide 305 and the plurality of second optical waveguides 310; in this example silica is in-between. In this example, the body 325 comprises a silica cladding which surrounds the first and second optical waveguides 305, 310, on a buried oxide BOX layer. However, it should be appreciated that the body 325 may be comprised of any suitable material(s).

In this example, the longitudinal axis of the first optical waveguide 305 is in substantially the same direction as the longitudinal axes of the plurality of second optical waveguides 310.

In this example, there are seven second optical waveguides 310, and the plurality of second optical waveguides 310 are substantially parallel to one another. However, it should be appreciated that for example the number of second optical waveguides 310 can be varied, depending for example on the mode shape of the input light for use with which the SSC 300 is designed.

In this example, as can be seen in FIG. 3b, the SSC 300 is designed to receive light from a semiconductor laser 340 which is butt coupled adjacent an end 335 of the SSC 300. More specifically, the semiconductor laser 340 is arranged to couple light into a first end portion 345 of the first optical waveguide 305. Both the SSC 300 and the semiconductor laser 340 are positioned on a common silicon substrate 330. However, the SSC 300 may alternatively be designed, for example, for use with a Semiconductor Optical Amplifier (SOA) or other light generating device.

The reflective part 315 is coupled to the plurality of second optical waveguides 310 and the output optical waveguide 320. Furthermore, the reflective part 315 is arranged to focus optical beams received from the plurality of second optical waveguides 310 into a single optical beam which is directed to the output optical waveguide 320.

In this example, the output optical waveguide 320, and reflective part 315, are also made from silicon, and the reflective part 315 and output optical waveguide 320 are part of the second layer 328 of the body 325 including the second optical waveguides 310. In this example, these elements 315, 320, 310 are formed in an integrated silicon layer 328.

In this example, the reflective part 315 is a parabolic mirror formed by etching a portion of the silicon layer in the shape of a parabola. However, other implementations of the reflective part 315 are feasible, as will be appreciated by those skilled in the art.

In this example, the output optical waveguide 320 extends in a direction i.e. has its longitudinal axis (which may be referred to as a third longitudinal axis) at a substantially 90-degree angle or rotation from the longitudinal axes of the plurality of second optical waveguides 310. However, the skilled person will appreciate that the SSC 300 may be designed such that the longitudinal axis of the output optical waveguide 320 is arranged at a different angle with respect to the longitudinal axis of the plurality of second optical waveguides 310. In this way a more compact optical beam spot size convertor may be provided as will be explained further below.

In this example, each of the plurality of second optical waveguides 310 and the output optical waveguide 320 have a taper along at least a portion of its length. However, in other embodiments it is possible for example that only one of the plurality of second optical waveguides 310 and the output optical waveguide 320 has a taper. As will be understood by those skilled in the art, such a taper may act to convert the mode shape, and thus spot shape, of an optical beam as it propagates along the respective waveguide.

In this example, as can be seen in FIG. 3a, each of the second optical waveguides 310 has an inverse taper along a portion of its length (i.e. along its longitudinal axis) extending towards the reflective part 315. This means that the width of each second optical waveguide 310 increases towards the reflective part 315. In this example, the inverse taper extends along substantially the entire length of each second optical waveguide 310. However, it is possible that the inverse taper extends only along a portion of the length of a second optical waveguide 310. In this example, the inverse taper is substantially exponential. However, other arrangements are possible, depending on the desired mode shape/beam spot size conversion of the SSC 300.

In this example, as again can be seen in FIG. 3a, the output optical waveguide 320 has a taper along a portion of its length (i.e. along its longitudinal axis) extending from the reflective part 315. Thus, the width of the output optical waveguide 320 decreases further from the reflective part 315.

FIG. 4 illustrates a change in mode shape and therefore spot size of light input into the SSC 300 during its propagation through the SSC 300. FIG. 5 shows an example spot size of light which may be input to the SSC 300 from a laser or a SOA. FIG. 4a shows the mode shape of light received at the first optical waveguide 305 at the reference axis 350 shown in FIG. 3. This light is coupled into the plurality of second optical waveguides 310. During propagation along the second optical waveguides 310 the mode of the respective optical beams is converted. FIG. 4b shows the mode shape of the optical beams output from the second optical waveguides 310 (i.e. input into the reflective part 315). The reflective part 315 then focuses the mode-converted optical beams received from the second optical waveguides 310 into a single optical beam for coupling into the output optical waveguide 320. The mode shape of this output single optical beam is illustrated in FIG. 4c. As the single optical beam propagates along the output optical waveguide 320, the mode shape of the beam may also be converted, as described above. Thus, the mode shape, and therefore spot size, of input light may be converted by the SSC 300.

Furthermore, advantageously, owing to the arrangement of the SSC 300, spot size conversion may be achieved using an SSC 300 which can be much smaller than the existing SSCs 100, 200 described above. Thus, the SSC 300 may be suitable for use with high integration PSoCs. In addition, coupling loss and misalignment tolerance may be the same or better than the coupling loss and misalignment tolerance of the existing SSCs 100, 200 described above. Furthermore, the arrangement of the SSC 300 may be suitable for mass-production at low cost, for example by using a CMOS fabrication process.

FIG. 6 shows example design parameters of the first optical waveguide 305. The first optical waveguide 305 has a width of 2700 nm, and a core length of only 12600 nm and a tapered tip length of only 2500 nm. As shown by the dotted lines, the tips 410 of the second optical waveguides 310 (on a layer below the first optical waveguide 305) start at 1498 nm from the input end 345 of the first optical waveguide 305.

FIG. 7 shows example design parameters of the silicon layer 328 comprising the plurality of second optical waveguides 310 (in this example seven), the reflective part 315 and the output optical waveguide 320. The total width of the plurality of second optical waveguides 310 is 4920 nm, there being 820 nm between the tips of adjacent pairs of second optical waveguides 310. The length of the second optical waveguides 310 is 13954 nm, therefore only slightly longer than the first optical waveguide 305. The total length of the reflective part 315 (along the y axis) is 8334 nm. Thus, the total length of the silicon layer 700 and first optical waveguide 305 layer when arranged on top of the silicon layer is approximately 23786 nm (i.e. 23.786 μm). Thus, the SSC 300 can be substantially smaller than the existing SSCs 100, 200 described above which have lengths in the region of hundreds of μm.

In this example as described above the output optical waveguide 320 extends at an approximate rightangle from the longitudinal axes of the second optical waveguides 310 which here are on the y axis. Thus the output optical waveguide 320 does not contribute to the length of the SSC 300. Example design parameters of the output optical waveguide 320 are shown in FIG. 8. In this example, the output optical waveguide 320 is formed from two triangles having different sizes, to form a taper. The total length of the output optical waveguide 320 is less than 12744 nm (12.744 μm). Thus, the total width of the silicon layer 700/first optical waveguide 305 layer is around 18000 nm (i.e. still only around 18 μm). Thus, the SSC 300 may be compact.

FIG. 9 shows design parameters of an example one of the second optical waveguides 320, which has a substantially exponential inverse taper. The taper on either side of the longitudinal axis (the y axis) is symmetric, and starts at a width of 50 nm. The inverse taper follows the equation $y=0.124487*e^{5*(x+1005)}-2.76339$ [μm].

FIG. 10 shows the design parameters of a cross section of the SSC 300 (i.e. the height or thickness of the SSC 300). In this example, the silicon layer 328, which in this example is arranged on a silica ($SiO_2$) BOX layer 1000, has a thickness of 220 nm, which is a fixed value in dependence on the wafer used. The BOX layer 1000 also has a fixed value, of 3000 nm, dependent on the wafer used. A silica layer 1005 which surrounds the silicon layer 328 has a height of 345 nm, and thus extends 152 nm above the silicon layer 328. The first optical waveguide 305 is provided on top of this silica layer 1005. Thus, in this example there is 125 nm of silica between the first optical waveguide 305 and the plurality of second optical waveguides 310. In this example, the first optical waveguide 305 has a thickness of 80 nm. A further silica layer 1010 surrounds the first optical waveguide 320, and in this example the total height of the SSC 300 is 6000 nm (6 μm).

The Applicant has performed a Finite Difference Time Domain (FDTD) simulation of the power distribution (logarithmic scale) at the silicon layer 328 of the above-described SSC 300 with the example design parameters detailed above. The result is shown in FIG. 11. It can be seen that as optical power is coupled into the plurality of second optical waveguides 310 from the first optical waveguide 305, the intensity of the optical beams in the respective second optical waveguides 310 increases. Those second optical waveguides 310 closest to the first optical waveguide 305 carry optical beams of a higher intensity than those further away. However, it is seen that those further away do still receive light from the first optical waveguide 310 and thus carry optical beams. These optical beams, which have propagated along the second optical waveguides 310, are then focussed into a single optical beam by the reflective part 315, which directs the optical beam such that it propagates along the output optical waveguide 320.

FIG. 12 shows the effect in this example of laser 340/SSC 300 misalignments on coupling efficiency. The coupling efficiency, in this example, is about 75%, equivalent to a loss of 1.25 dB, which is equal to or better than the coupling efficiency of the existing SSCs 100, 200 described above. Furthermore, it is seen that the lateral positioning tolerance is higher than +−1 μm for a loss variation of 1 dB and this again is equal to or better than the existing SSCs 100, 200 described above.

FIG. 13 illustrates a photonic system chip 1300 comprising an SSC (not shown) as described above. The SSC 300 may for example be provided on a silicon substrate 330 within the photonic system chip 1300. The SSC 300 may for example be butt coupled to a Laser or Semiconductor Optical Amplifier (SOA) or any other light generating device.

Thus, embodiments of the present invention may provide an optical beam spot size convertor having a smaller size than the existing SSCs 100, 200 described above, without increasing coupling loss and/or misalignment tolerance.

Advantageously, embodiments of the present invention may also provide an optical beam spot size convertor which is simple to mass-produce, at low cost. Advantageously, such an optical beam spot size convertor may be used to increase the density of photonic integrated circuits in a silicon photonic system on a chip (PSoC).

The invention claimed is:

1. An optical beam spot size convertor having a body that comprises:
   a first optical waveguide having a first refractive index;
   a plurality of second optical waveguides, each having a second refractive index higher than the first refractive index, wherein the first optical waveguide is arranged to receive an input optical beam, and wherein the first optical waveguide is arranged such that light from the input optical beam is coupled from the first optical waveguide into the plurality of second optical waveguides;
   an output optical waveguide; and
   a reflective part coupled to the plurality of second optical waveguides and to the output optical waveguide, wherein the reflective part is arranged to focus optical beams received from the plurality of second optical waveguides into a single optical beam which is directed to the output optical waveguide.

2. The optical beam spot size convertor of claim 1, wherein the first refractive index is higher than a refractive index of the body.

3. The optical beam spot size convertor of claim 1, wherein the first optical waveguide is made from a silicon compound.

4. The optical beam spot size convertor of claim 3, wherein the silicon compound is silicon nitride.

5. The optical beam spot size convertor of claim 1, wherein the plurality of second optical waveguides are made from silicon.

6. The optical beam spot size convertor of claim 1, wherein the output optical waveguide is made from silicon.

7. The optical beam spot size convertor of claim 1, wherein at least one optical waveguide, of the group comprising the plurality of second optical waveguides and the output optical waveguide, has a taper of its width along at least a portion of its length.

8. The optical beam spot size convertor of claim 7, wherein each of the second optical waveguides has an inverse taper of its width along at least a portion of its length extending towards the reflective part.

9. The optical beam spot size convertor of claim 8, wherein the inverse taper is substantially exponential.

10. The optical beam spot size convertor of claim 1, wherein the output optical waveguide has a taper of its width along at least a portion of its length extending from the reflective part.

11. The optical beam spot size convertor of claim 1, wherein the first optical waveguide is part of a first layer of the body and the plurality of second optical waveguides are part of a second layer of the body, wherein the first layer is provided above the second layer such that at least a portion of the first optical waveguide is arranged above at least a portion of the plurality of second optical waveguides.

12. The optical beam spot size convertor of claim 11, wherein the reflective part and the output optical waveguide are also part of the second layer.

13. The optical beam spot size convertor of claim 1, wherein the first optical waveguide has a first longitudinal axis and the plurality of second optical waveguides each have a second longitudinal axis, wherein the first longitudinal axis and the second longitudinal axis are in substantially the same direction.

14. The optical beam spot size convertor of claim 13, wherein the output optical waveguide has a third longitudinal axis, and wherein the output optical waveguide is arranged such that its third longitudinal axis is at an angle with respect to the second longitudinal axis.

15. A photonic system chip comprising an optical beam spot size convertor according to claim 1.

* * * * *